(12) United States Patent
Tortora et al.

(10) Patent No.: US 7,738,687 B2
(45) Date of Patent: Jun. 15, 2010

(54) METHOD OF REGISTRATION IN A CONTRABAND DETECTION SYSTEM

(75) Inventors: John O. Tortora, Westford, MA (US); Jeffrey H. Stillson, Merrimack, NH (US); Kristoph D. Krug, Sudbury, MA (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 855 days.

(21) Appl. No.: 11/637,226

(22) Filed: Dec. 11, 2006

(65) Prior Publication Data

US 2007/0172129 A1 Jul. 26, 2007

Related U.S. Application Data

(63) Continuation of application No. 11/400,489, filed on Apr. 7, 2006, now abandoned.

(60) Provisional application No. 60/669,088, filed on Apr. 7, 2005, provisional application No. 60/669,173, filed on Apr. 7, 2005.

(51) Int. Cl.
*G06K 9/00* (2006.01)

(52) U.S. Cl. ................. 382/132; 382/131; 382/141; 382/151; 382/285; 382/294

(58) Field of Classification Search ............... 382/131, 382/132, 141, 151, 285, 294
See application file for complete search history.

(56) References Cited

U.S. PATENT DOCUMENTS

| 5,642,393 | A | 6/1997 | Krug et al. | |
|---|---|---|---|---|
| 6,856,667 | B2 | 2/2005 | Ellenbogen | |
| 7,561,757 | B2 * | 7/2009 | Sabuncu et al. | 382/294 |
| 7,587,082 | B1 * | 9/2009 | Rudin et al. | 382/154 |
| 2002/0172324 | A1 * | 11/2002 | Ellengogen | 378/57 |

* cited by examiner

*Primary Examiner*—Tom Y Lu
(74) *Attorney, Agent, or Firm*—Wolf, Greenfield & Sacks, P.C.

(57) ABSTRACT

A multi-level contraband detection system. At a first level, the system obtains volumetric information about an item under inspection. The volumetric information provides a basis for identifying suspect objects in the item under inspection and their locations. The location information is expressed in a first coordinate system relative to the device used for first level scanning. When first level scanning identifies a suspicious object, the item under inspection is passed to a second level scanner that can take further measurements on the suspicious objects. The second level machine is controlled in a second coordinate system. A translation between the two coordinate systems is obtained by registering a multi-dimensional image obtained at the first level with positioning information obtained at the second level. Registration is performed using a coarse and then a fine registration process for quick and accurate registration.

20 Claims, 9 Drawing Sheets

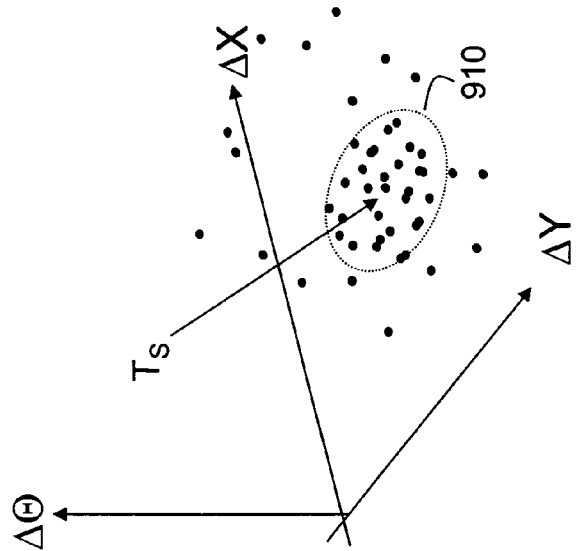
FIG. 9
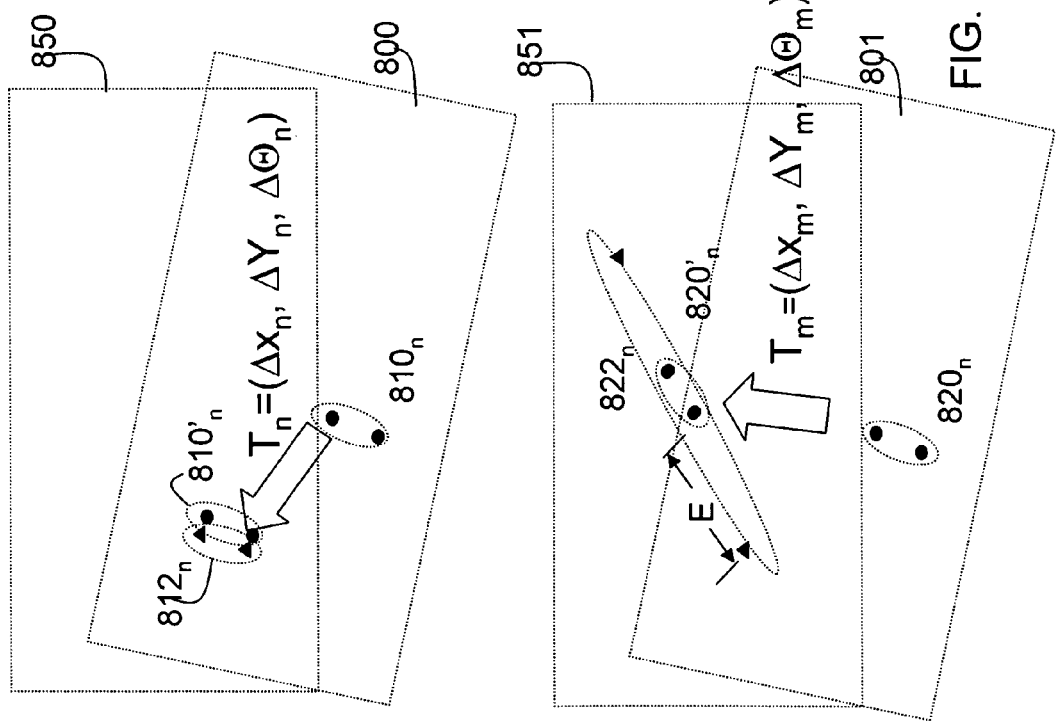
FIG. 8A
FIG. 8B

METHOD OF REGISTRATION IN A CONTRABAND DETECTION SYSTEM

RELATED APPLICATIONS

This application is a continuation of, and claims priority under 35 U.S.C. §120 to U.S. patent application Ser. No. 11/400,489, entitled "METHOD OF REGISTRATION IN A CONTRABAND DETECTION SYSTEM," filed on Apr. 7, 2006, which in turn claims priority under 35 U.S.C. §119(e) to U.S. Provisional Application Ser. No. 60/669,088, entitled "DATA EXCHANGE TO COORDINATE TWO BAGGAGE INSPECTION MACHINES," filed on Apr. 7, 2005, and U.S. Provisional Application Ser. No. 60/669,173, entitled "REGISTRATION SCHEME IN EXPLOSIVES DETECTION SYSTEM," filed on Apr. 7, 2005. Each of the above-referenced applications is hereby incorporated by reference in its entirety.

BACKGROUND OF INVENTION

1. Field of Invention

This invention relates generally to contraband detection systems and more specifically to registration of images in a contraband detection system.

2. Discussion of Related Art

Contraband detection systems are widely used in settings where it is desirable to determine whether an item conceals contraband objects. A prevalent use of such systems is in the detection of weapons or explosives inside suitcases or packages before those items are allowed on airplanes. However, contraband detection systems are used in other facilities where it is desired to prevent weapons or explosives from entering a secured area. Additionally, contraband detection systems are used to identify objects other than weapons or explosives. For example, such a system may be used to check for drugs, illicit currency or other contraband hidden in parcels or other objects.

Frequently, contraband detection systems detect contraband by processing an image of an item under inspection. The image is formed by measuring penetrating radiation that has passed through, and been attenuated by, an item under inspection. The image represents objects inside the item and contraband is frequently detected by identifying regions in the image representing an object of a shape or density characteristic of a contraband object.

Other information may be used to detect contraband objects hidden in items under inspection. For example, some contraband detection systems image items using radiation of multiple energy levels. Because the amount an object attenuates radiation depends on the object's atomic number, multi-energy radiation that has passed through an item allows an effective atomic number of objects in the item to be computed. Identifying regions in the image that represent objects having an effective atomic number characteristic of contraband can increase the accuracy with which contraband is detected.

Various imaging configurations are used in contraband detection systems. In some configurations, the system may acquire an image using radiation passing through an item under inspection in a single direction. Such a configuration results in a projection, or "single view," image, which contains a two dimensional representation of objects in the item under inspection. A two-dimensional image is often useful for contraband detection, particularly when contraband objects of interest have a distinctive appearance regardless of the angle from which they are viewed.

Multi-view imaging systems are also used. In a multi-view system, radiation passes through an item under inspection from multiple directions, such as from three directions. This information can be processed to compute an "image" that more accurately represents objects inside the item.

An image that even more accurately represents an item can be formed with a volumetric imaging system. In a volumetric imaging system, an image of an item is created as a set of "voxels." Each voxel represents properties of a small volume of the item under inspection. Accordingly, the contraband detection system identifies contraband objects by finding groups of voxels with characteristics indicating that a contraband object is present. As with projection or multi-view imaging systems, a volumetric image can represent mass, atomic number or other characteristics of an item under inspection.

Volumetric images are frequently formed using computed tomography (CT) processing. Traditional CT processing builds a volumetric image by measuring characteristics of thin sections, called "slices," of an item under inspection. The system obtains data on a slice that is adjacent an x-ray source that moves around the item. Once sufficient data has been gathered for one slice, the system moves the item under inspection so that another slice is adjacent the source. Data from slices is grouped to form a representation in three-dimensions of the item under inspection.

Some systems use a related technique called a helical scan. In a helical scan, the item under inspection moves continuously past the x-ray source as data is collected. Mathematical manipulation of the data is used to create a volumetric image comparable to that created with a traditional CT scanner.

Regardless of the specific type of system used to form an image, it is desirable that the identification of contraband objects be quick and accurate. Automated processing is frequently used to identify suspect objects within an item. Initial processing may not definitively identify whether an item contains a contraband object, but may be sufficient to distinguish between an item that warrant further inspection and items that are "cleared" and require no further inspection. This initial processing is sometimes referred to as Level I inspection.

Items deemed suspicious at Level I inspection are then passed to Level II (or higher levels) inspection. Level II could involve further automated inspection or may involve manual inspection.

Various systems using multiple levels of inspection are known. Examples of such systems are provided in U.S. Pat. No. 5,642,393 entitled "Detecting Contraband by Employing Interactive Multiprobe Tomography," by Krug et al. and U.S. Pat. No. 6,856,667, entitled "X-Ray Inspection System" by Ellenbogen, both of which are hereby incorporated by reference.

SUMMARY OF INVENTION

In one aspect, the invention relates to a method of operating a contraband detection system to inspect an item. According to the method, a volumetric image of the item is formed in a first coordinate system. The volumetric image is used to identify a region of interest in the item. Positional information about the item is obtained in a second coordinate system and the volumetric image is registered to the positional information to identify the region of interest in the second coordinate system. A region of the item is selected for further inspection based on the region of interest in the second coordinate system.

In another aspect, the invention relates to a method of operating a contraband detection system to inspect an item. The method includes forming a volumetric image of the item in a first coordinate system and identifying a region of interest in the item using the volumetric image. A projection image of the item is formed in a second coordinate system and the volumetric image is registered to the projection image to identify the region of interest in the second coordinate system. The method also includes selecting a region of the item for further inspection based on the region of interest in the second coordinate system.

In a further aspect, the invention relates to a method of registering a first image with a second image that includes identifying a plurality of points in the first image and identifying a plurality of points in the second image. For each of a plurality of pairs of subsets, each of which comprises a subset of points in the first image and a subset of points in the second image, a transformation is computed that maps the subset of points in the first image to the subset of points in the second image. A likely transformation is identified from the transformations for each of the plurality of subsets. The likely transformation is used in registering the first image and the second image.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 8A is a sketch illustrating selecting a transformation with a low error during image registration during the process of FIG. 7;

FIG. 8B is a sketch illustrating selecting a transformation with a high error during image registration during the process of FIG. 7;

FIG. 9 is a graphical illustration of selecting a most likely transformation during the process of FIG. 7.

DETAILED DESCRIPTION

Figure 1:
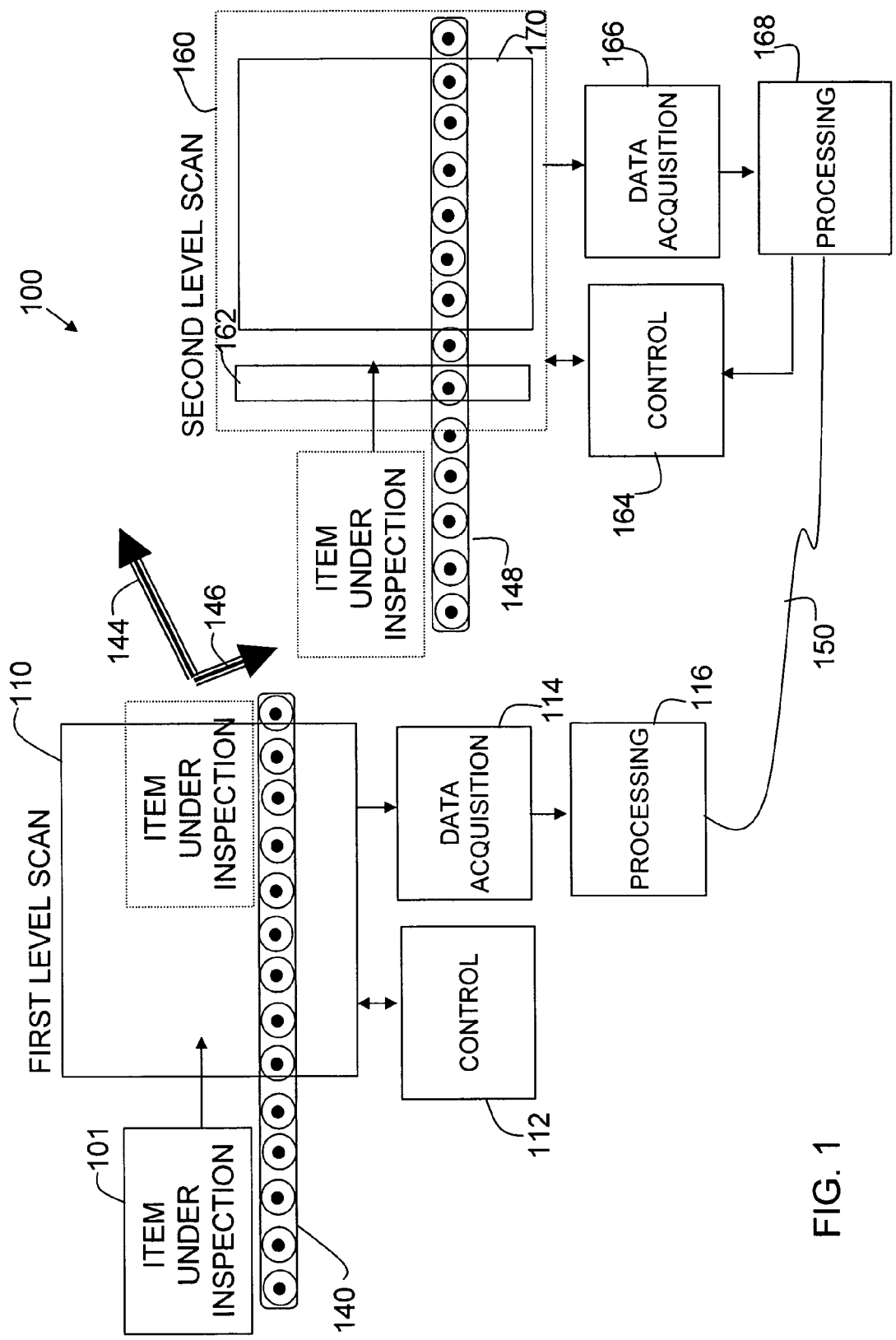
FIG. 1 is block diagram illustrating an explosive detection system according to an embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1 shows a contraband detection system that may incorporate an embodiment of the invention. In this example, the contraband detection system is used to inspect items, such as suitcases or parcels, for the presence of contraband items, particularly explosives.

Explosive detection system 100 includes a first level scanner, here shown as volumetric scanner 110, and a second level scanner 160, here shown to include a coherent x-ray scatter system 170. The first level scanner may be connected to second level scanner 160 through a baggage handling system.

In the embodiment of FIG. 1, the baggage handling system is shown to include a conveyor 140 that moves an item under inspection 101 through the first level scanner. Conveyor 140 is coupled to conveyors 144 and 146. Following first level scanning, the baggage handling system may divert an item under inspection to either conveyor 144 or conveyor 146 based on the results of the first level inspection. Items cleared as a result of first level inspection may be routed on conveyor 144, where they are allowed to enter a secured area. If explosives detection system 100 is used at an airport, a cleared item may be loaded onto an aircraft or returned to a passenger for carry-on to an aircraft.

Items deemed suspect may be diverted to conveyor 146. Conveyor 146 carries items under inspection to second level scanner 160 where conveyor 148 then moves items under inspection through second level scanner 160. Second level scanner 160 obtains further information on suspect items to determine more definitively whether the item contains contraband.

In the example of FIG. 1, first level scanner is a volumetric scanner 110, such as a CT scanner or helical scanner. Volumetric scanner 110 includes a control module 112, a data acquisition module 114 and a processing module 116. In operation, control module 112 generates signals necessary to move an item under inspection through volumetric scanner 110 and to control an x-ray source and other components within the volumetric scanner 110 to collect x-ray attenuation data on item under inspection 101 as it passes through volumetric scanner 110.

Data acquisition module 114 records x-ray attention data from detectors within volumetric scanner 110. The data collected by data acquisition module 114 is provided to processing module 116, which forms a volumetric image from the acquired data. Processing module 116 also performs first level threat detection processing based on the volumetric image. As a result of the processing within module 116, a determination is made whether an item under inspection is cleared or is suspect and needs to be routed for second level inspection.

Volumetric scanner 110 may be implemented using conventional technology techniques. Control module 112, data acquisition module 114 and processing 116 may be each implemented on a separate printed circuit board that is physically inserted in a chassis making up volumetric scanner 110. However, it is not necessary that each module be implemented as a separate printed circuit board or other unit. It is also not necessary that the modules be integrated into a chassis holding volumetric scanner 110. For example, any or all of the functions performed by control module 112, data acquisition module 114 and processing module 116 may be performed in a separate computer connected to the volumetric scanner 110 directly or over a network.

If item under inspection 101 is determined to be suspect following first level inspection, item 101 passes to second level scanner 160. Second level scanner 160 makes measurements of item under inspection 101 to either confirm that it contains a contraband item or to clear it. Second level scanner 160 may use any suitable inspection methodology to perform second level scanning.

In an explosive detection system 101, second level scanner 160 may use coherent x-ray scattering to resolve whether a suspect item contains explosive material. Coherent x-ray scattering is a known technique for explosive detection. In a coherent x-ray scatter system, a beam of x-ray radiation is directed at a region within an item under inspection. The angle at which x-rays are scattered from that region is measured. The scattering angle provides information about the nature of the material in the region.

Second level scanner 160 includes a control module 164, a data acquisition module 166 and a processing module 168. Control module 164 generates signals to control motion of an item under inspection through second level scanner 160 and to operate a coherent x-ray scatter system to measure material properties at desired regions. Data acquisition module 166 captures data generated within second level scanner 160. Processing module 168 processes the data to make a determination whether a suspect item can be cleared or whether the suspect item likely contains an explosive object and needs to be processed accordingly. Control module 164, data acquisition module 166 and processing module 168 may be implemented using techniques conventional in explosives detection systems.

For a coherent x-ray scatter system to provide useful data, it must be focused on one small region in an item. The region should preferably be uniform and must be part of an object identified as suspicious during the first level inspection. FIG. 1 shows second level scanner 160 coupled to volumetric scanner 110 so that second level scanner 160 may obtain information from volumetric scanner 110 identifying regions of item under inspection 101 that are suspicious. In the embodiment of FIG. 1, information is passed over network 150 that connects processing module 116 to processing module 168. Network 150 is shown as a wired network, but may be implemented using any suitable networking technology. However, a network is not required and processing module 116 may be coupled to processing module 168 in any suitable fashion.

Information concerning an item under inspection 101 may be passed from processing module 116 to processing module 168 in any suitable format. For example, processing module 116 may send a packet of data over network 150 for each item under inspection diverted to second level scanner 160. Such a packet, for example, may contain an identifier of the specific item under inspection.

In addition, the packet may contain an indication of the results of first level inspection at volumetric scanner 110. The results of first-level inspection may indicate a type of threat suspected. The type of threat may indicate that an object is suspected to be made of a specific material or have a specific shape characteristic of a threat. Additionally, the data packet may identify the position of the threat object. In many conventional inspection systems, a threat object is identified in an image presented to a human operator by drawing a rectangle or other similar shape around the location in the image where the threat object appears. A data packet transmitted from processing module 116 to processing module 168 in conjunction with a suspicious item under inspection may include information to describe the location of a threat rectangle for each suspicious object identified. Communicating a threat rectangle to second level scanner 160 would allow processing module 168 to select appropriate locations in the item under inspection at which coherent x-ray scatter measurements may be made. However, in other embodiments, processing module 116 may select appropriate locations for coherent x-ray scatter measurements and communicate the coordinates of the locations where coherent x-ray scatter measurements are warranted.

Regardless of the specific form in which information is communicated from processing module 116 to processing module 168, processing module 168 must relate the positional information communicated from volumetric scanner 110 to a specific location or locations at which second level scanner 160 must be controlled to make measurements. Accordingly, processing module 168 must relate the coordinate system used by volumetric scanner 110 to a coordinate system used by control module 164 to control locations at which coherent x-ray scatter measurements are taken.

If motion of an item under inspection could be precisely controlled as it moved through the material handling system from volumetric scanner 110 to second level scanner 160, positions measured at volumetric scanner 110 could be translated to positions within second level scanner 160 by simple accounting for motion of the item as it passed through the material handling system. However, it is difficult to construct a material handling system that can so precisely control the motion of an item under inspection that measurements made in volumetric scanner 110 can be related accurately to positions within second level scanner 160 when the item under inspection 101 reaches second level scanner. In the example shown in FIG. 1, the material handling system passes item under inspection 101 from conveyor 140, across conveyor 146 to conveyor 148. As an item under inspection moves through the material handling system, and particularly as it transitions from one conveyor to another, the item under inspection can slide or rotate relative to the conveyors. Consequently, further processing is required to relate suspicious regions identified by volumetric scanner 110 to specific locations at second level scanner 160 where coherent x-ray scatter measurements are to be made.

In explosive detection system 100, this further processing is performed by using a registration device at second level scanner 160. In some embodiments, the registration device may be a projection scanner 162 accurately positioned relative to a coherent x-ray scatter system 170, which together form second level scanner 160. In the embodiment pictured in FIG. 1, the projection x-ray scanner 162 is construction as part of the same physical unit as coherent x-ray scatter system 170. Item under inspection 101 passes on a single conveyor 148 through both projection x-ray scanner 162 and coherent x-ray scatter system 170.

Information collected using projection x-ray scanner 162 may be processed within processing module 168 to relate suspicious regions identified by volumetric scanner 110 to locations within coherent x-ray scanner system 170 at which coherent x-ray scatter measurements are to be made. Processing module 168 may provide these locations to control module 164, which then controls coherent x-ray scatter system 170 to take measurements in the desired locations.

A projection x-ray scanner is just one example of a registration device that may be used at second level scanner 160. For example, a registration device may be formed using an optical camera that forms a visual image of item under inspection 101 as it passes along conveyor 148 into coherent x-ray scatter system 170. Alternatively, a registration device may be constructed using laser beams or other technologies to determine the outline of item under inspection 101.

Regardless of the specific technology used to construct a registration device, an image of the item formed by the registration device is compared to an image formed by volumetric scanner 110. These images are "registered" by computing a transformation that can be applied to one of the images to make features in one image appear at the same location as corresponding features in the other image. This transformation can be used to relate positions of suspicious regions detected by volumetric scanner 110 to locations at which measurements are made within second level scanner 160.

Figure 2:
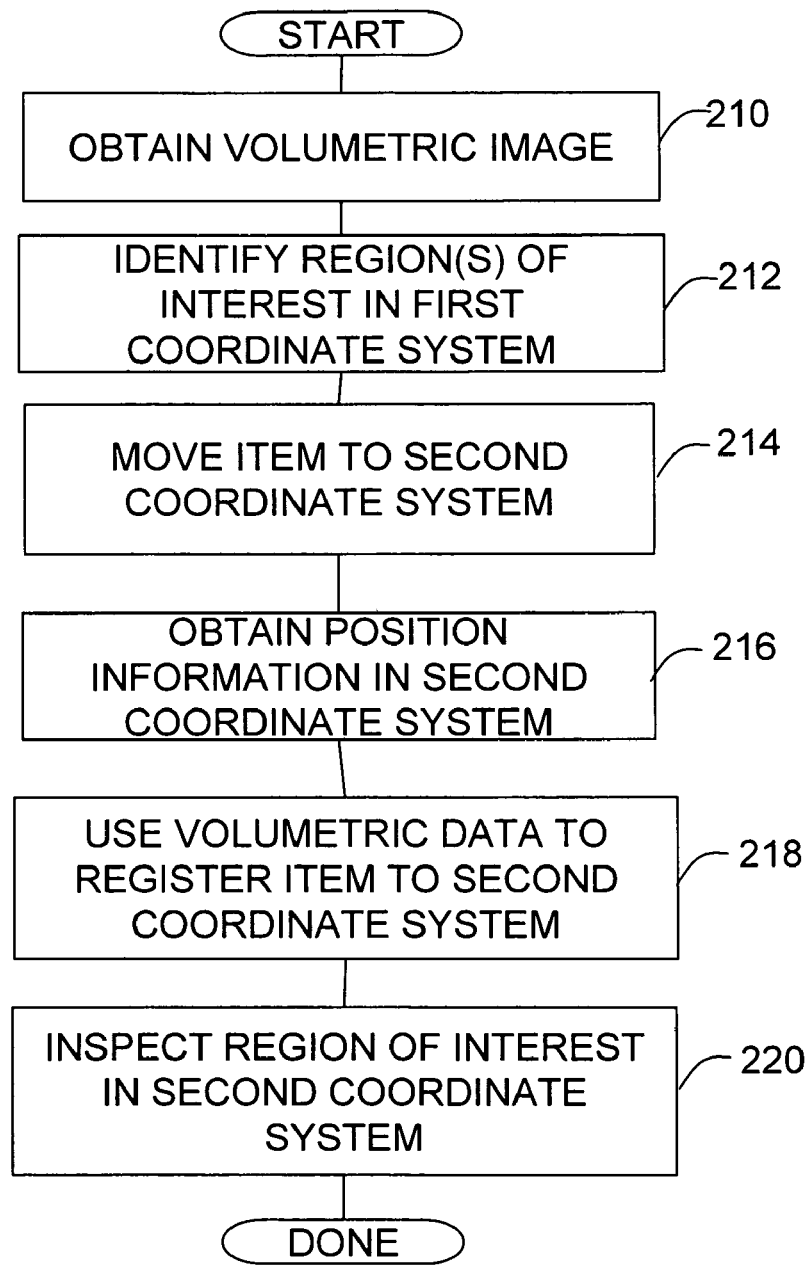
FIG. 2 is a flow chart illustrating an inspection process according to an embodiment of the invention.

FIG. 2 illustrates a flowchart of the processing to perform this registration. The process begins at step 210 where a volumetric image of an item under inspection is formed.

At block 212, regions of interest are identified in the volumetric image. The regions of interest will be in a first coordinate system used by the device, such as volumetric scanner 110 (FIG. 1), that constructed the volumetric image.

At step 214, the item under inspection is moved to a second level inspection station. Second level inspection station makes measurements at positions relative to a second coordinate system. Accordingly, it is necessary to relate the regions of interest identified in the first coordinate system at block 212 with the second coordinate system used by the second level scanner.

At block 216, positional information on the item under inspection is obtained in the second coordinate system. As described above in connection with FIG. 1, positional information on the item under inspection may be obtained with an x-ray line scanner, a video camera, a laser system or other suitable device.

The positional information in the second coordinate system is then related to the positional measurements in the first coordinate system. To relate the two coordinate systems, the volumetric image formed at block 210 is registered to the positional information obtained at block 216.

In embodiments described herein, positional information obtained at block 216 is a two-dimensional of the item under inspection. For example, a photograph taken with a video camera results in a two-dimensional photograph showing the outline of the item under inspection. An image formed with a projection x-ray scanner results in a two-dimensional x-ray image, showing the interior of the item under inspection. In embodiments in which the positional information obtained at block 216 is two-dimensional, processing at block 218 may first form a two-dimensional representation of the volumetric image. As one example of such processing, known mathematical techniques for projecting a three-dimensional object into a plane may be used. Once the volumetric image is projected into a two-dimensional plane, it may be registered to a two-dimensional image obtained at block 216.

Processing at 218, as part of that registration, determines a translation required to register the two-dimensional projection formed from the volumetric image in the first coordinate system to the two-dimensional image form in the second coordinate system. The same translation computed at block 218 may be applied to the regions of interest identified in the first coordinate system at block 212. By applying the same transformation to the regions of interest, the locations of those regions in the second coordinate system may be identified. Based on these regions, locations for measurements at the second level inspection system may be determined. Accordingly, at block 220, the regions of interest are identified in the second coordinate system and measurements are made on them. Thereafter, conventional processing may be used to determine whether the regions of interest identified as part of the first level inspection are part of a contraband item.

The processing in blocks 210, 212, 214, 216, 218 and 220 may be performed with any suitable hardware and software. Explosive detection system 100 (FIG. 1) is just one example of a system that could perform the process.

FIGS. 3-10 provide an example of an embodiment of the process shown in FIG. 2.

Figure 3:
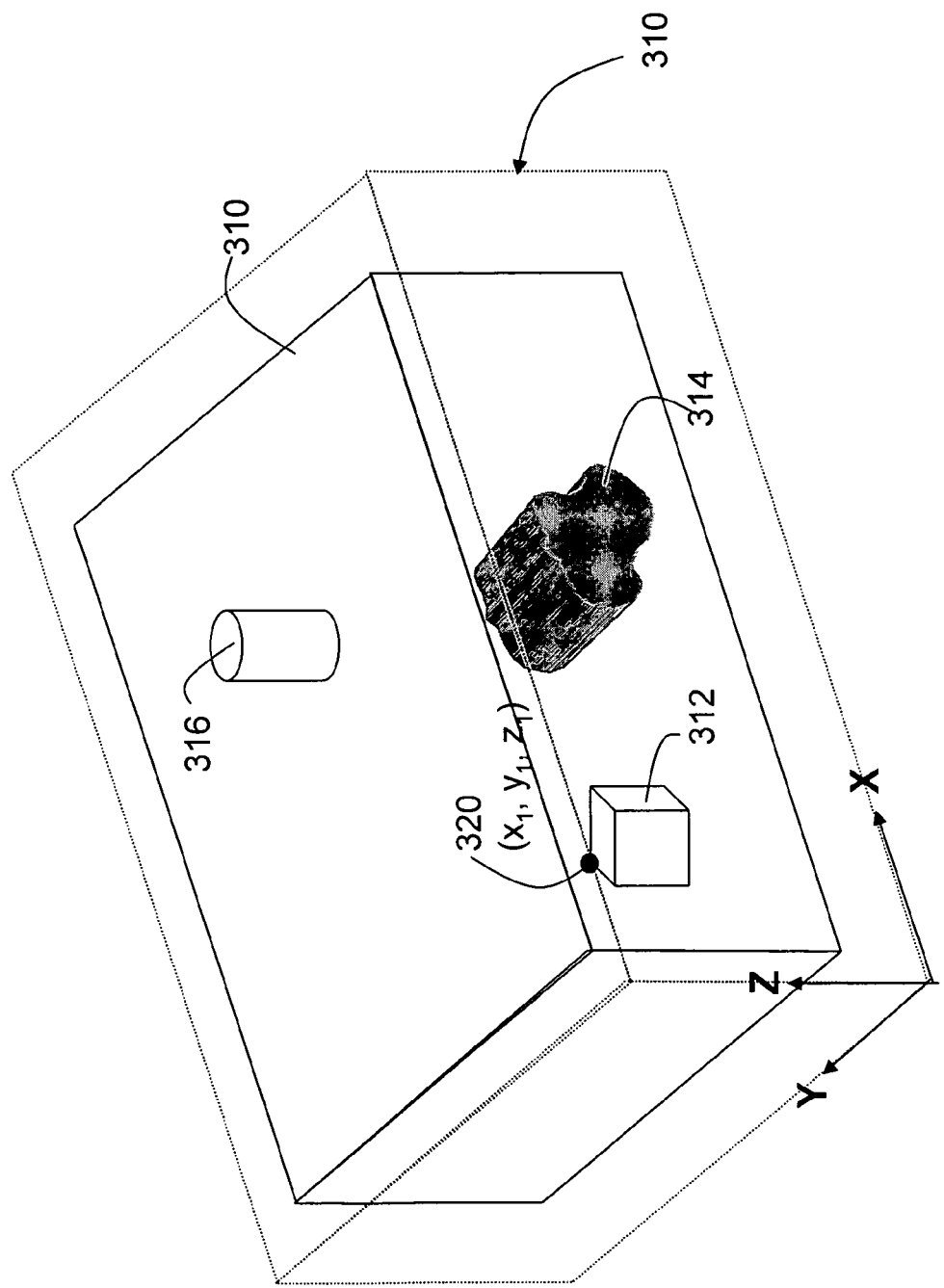
FIG. 3 is a sketch illustrating a volumetric image of an item under inspection formed at a first stage of the explosive detection system of FIG. 1.

FIG. 3 depicts volumetric image 300 of an item under inspection. Volumetric image 300 reveals that item under inspection 310 contains multiple objects. Here, objects 312, 314 and 316 are shown. In FIG. 3, volumetric image 300 is shown graphically. Such a representation is useful for inspection by a human operator. However, as used herein, the term "image" is not limited to a graphical representation of an item. For images processed by computers, an image may be simply ordered data describing locations in an item under inspection.

Volumetric image 300 is formed in an X, Y, Z coordinate system. Accordingly, every point within volumetric image 300 may by represented by an X, a Y and a Z coordinate. For example, point 320 is shown to have coordinates $(x_1, y_1, z_1)$.

Figure 4A:
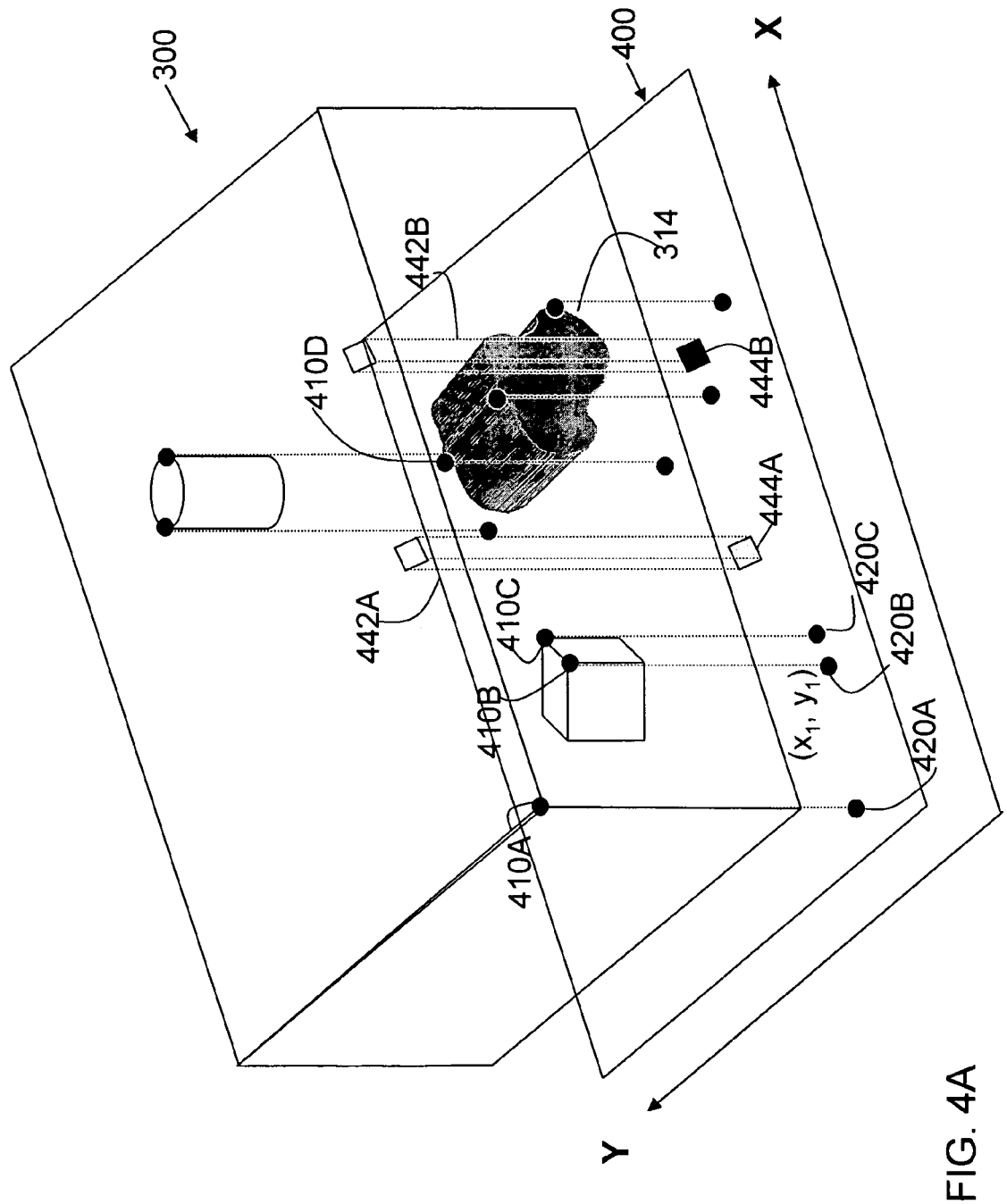
FIG. 4A is a sketch illustrating forming a projection image from a three-dimensional image during image registration according to an embodiment of the invention.

FIG. 4A illustrates two ways in which volumetric image 300 may be projected to form a two-dimensional image 400. The first way is termed a "volumetric projection." To form a volumetric projection, volumetric image 300 may be processed in columns running perpendicular to the plane of the two-dimensional image 400. In FIG. 4A, columns 442A and 442B are shown. Only two columns are shown for simplicity. To form the projection, columns are formed to occupy the entire three-dimensional extent of volumetric image 300. Likewise, the entire extent of two-dimensional image 400 is intersected by a column.

Each column is converted to a pixel in the two-dimensional image. In the volumetric image 300 in which each voxel has a value related to attenuation of x-rays passing through regions of an item under inspection, each column may be converted to a value in the two-dimensional image by combining values of the voxels. The voxels in a column may be combined by adding the attenuations at each voxel in the column. For example, the attenuation values of each of the voxels in column 442A could be added to compute the attenuation associated with pixel 444A. Likewise, the attenuation values associated with the voxels in column 442B could be added to compute an attenuation associated with pixel 444B. To illustration the computation performed on each column, FIG. 4A shows column 442B passing through object 314, which has a relatively high attenuation. Column 442A does not pass through any of the dense objects in volumetric image 300. Accordingly, pixel 444A is shown to represent a lower attenuation than pixel 444B.

The two-dimensional image formed by projecting the volumetric image in this fashion would resemble a two-dimension image formed with a projection x-ray scanner. Once the volumetric image is projected to a two-dimensional image, the volumetric image can be readily compared to an image formed with a projection x-ray scanner and the images can be registered using conventional processing.

FIG. 4A also shows an alternative technique for projecting a volumetric image to a two-dimensional image. This technique is referred to as "symbolic projection." To form a symbolic projection, specific points in the volumetric image are identified and projected into a two dimensional image. The symbolic projection contains only the projection of the identified points. For example, FIG. 4A shows points 410A, 410B and 410C in volumetric image 300. When projected into a two-dimensional image, points 410A, 410B and 410C map to points 420A, 420B and 420C. Mapping a point in a volumetric image to a two-dimensional image is computationally straightforward. In the three-dimensional image, each point is represented by an X, a Y and a Z coordinate. In the two dimensional projection 400, each point is represented by only an X and a Y coordinate. The X and Y coordinate in the projection image may be the same as the X and Y coordinate in the volumetric image. Accordingly, the projection of a point may be computed by simply ignoring the Z coordinate of that point in the volumetric image.

Any suitable method may be used to select points in the volumetric image for projection into the two-dimensional image. It is not necessary that every point in the volumetric image be projected into the two-dimensional image. Appropriate selection of points in the volumetric image for projection into a two-dimensional image may reduce the amount of data processing required. Appropriate selection may also increase the accuracy with which the volumetric image may be registered with a two-dimension image of the item under inspection.

One approach to selecting points in the volumetric image is to select points representing objects that can be readily identified in either a volumetric image or a two-dimensional x-ray projection image of the item under inspection. For example, if the item under inspection is a suitcase, the suitcase may contain clothes with metal buttons. Metal buttons may stand out in an x-ray image, whether formed as a volumetric image or a two-dimensional x-ray projection image. Features that stand out are sometimes referred to as "fiducials." Accordingly, one approach to selecting points in the volumetric image may be to identify fiducials.

Alternatively, it may be desirable to select points in volumetric image 300 other than by identifying fiducials. One alternative approach is to perform feature extraction processing on the volumetric image 300. Known processing techniques are available to identify edges, corners and other types of features in an image. FIG. 4A illustrates points within volumetric image 300 that have been selected using feature extraction processing. For example, points 410A, 410B and 410C each represent a corner of an object and may be recognized according to known feature extraction processing. Other points representing features in image 300 may also be identified, but such further points are not labeled for simplicity.

Forming a symbolic projection in this fashion provides an alternative approach for comparing a volumetric image to a two-dimensional image as part of the registration process performed at block 218 (FIG. 2). In some embodiments, both volumetric and symbolic projections may be formed. The symbolic projection is used first to perform a coarse registration on the two images. Thereafter, the volumetric projection may be used to perform a fine registration of the volumetric image to the two-dimensional x-ray projection image of the item under inspection.

Figure 4B:
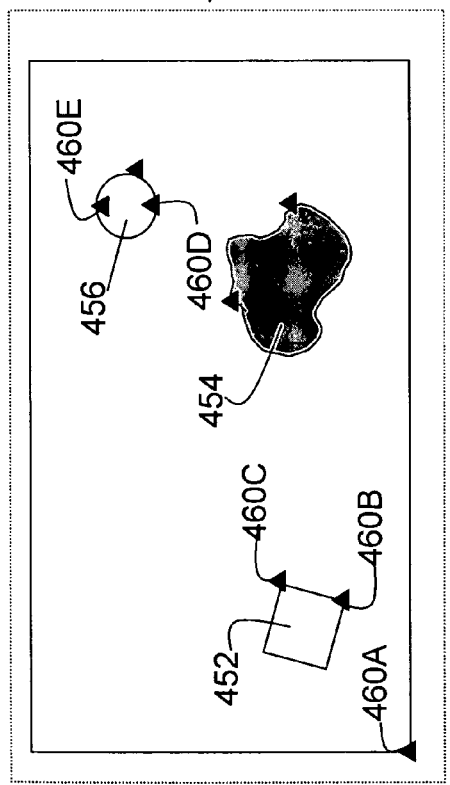
FIG. 4B is a sketch illustrating feature extraction on a two-dimensional image during image registration according to an embodiment of the invention.

To provide a further example of image registration, FIG. 4B shows a two-dimensional x-ray image 450. Image 450 includes regions 452, 454 and 456 that corresponds to regions 312, 314 and 316 in the sense that corresponding regions represent the same object within an item under inspection. However, regions 452, 454 and 456 in two-dimensional x-ray image 450 represent a projection of each object, but the regions 312, 314 and 316 in volumetric image 310 (FIG. 3) represent the object in three dimension.

To register two-dimensional x-ray image 450 with volumetric image 310, image 450 could be compared either to a volumetric projection or a symbolic projection of volumetric image 310. To compare two-dimensional x-ray image 450 to a symbolic projection, points associated with features in two-dimensional x-ray image 450 could be selected and matched to the points in the symbolic projection formed of volumetric image 310. Accordingly, FIG. 4B shows points selected in two-dimensional image 450 using feature extraction processing.

The feature extraction processing of two dimensional x-ray image 450 may be similar to the feature extraction processing used on volumetric image 300 that is adapted for processing in two dimensions. However, it is not necessary that the same algorithms be used for feature extractions in both images. It is also not necessary that features corresponding to the same points within the item under inspection be identified in both two-dimensional x-ray image 450 and in volumetric image 310. For example, FIG. 4B shows points 460A, 460B and 460C identified in two-dimensional x-ray image 450. Those points correspond to the same locations within the item under inspection as points 410A, 410B and 410C (FIG. 4A). However, FIG. 4A shows point 410D that does not correspond to any of the points selected in two-dimensional x-ray image 450. Likewise, two-dimensional x-ray image 450 shows points 460D and 460E that do not correspond to any points selected in volumetric image 300. Nonetheless the selected points are sufficient to register the images.

Figure 5B:
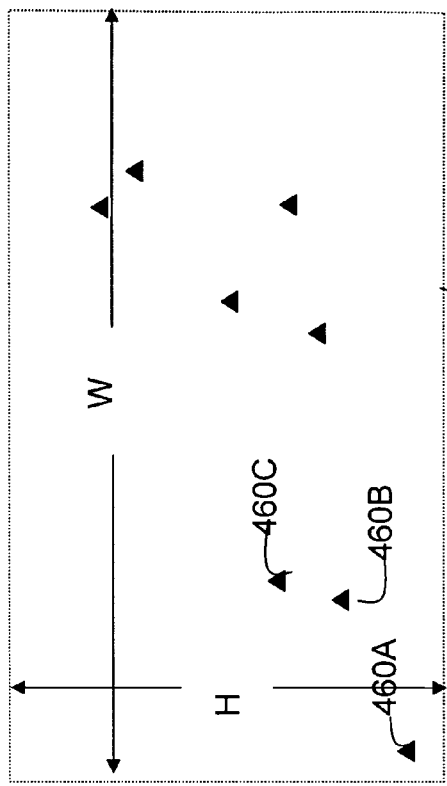
FIG. 5B is a sketch illustrating a symbolic image formed from the two-dimensional image of FIG. 3B according to an embodiment of the invention.
Figure 5A:
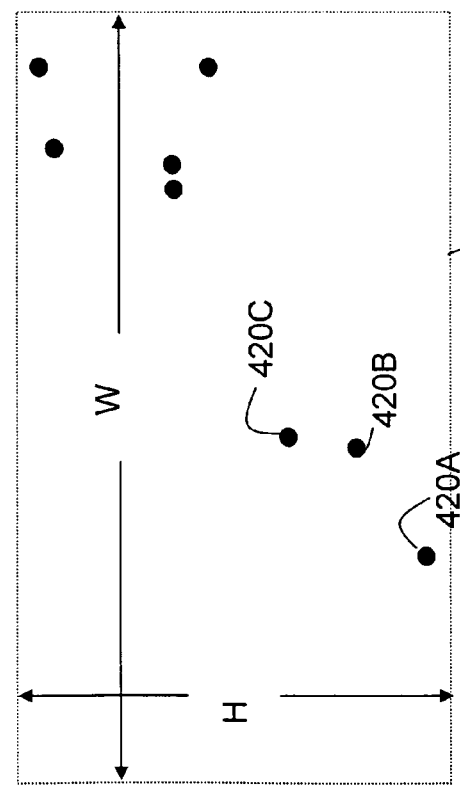
FIG. 5A is a sketch illustrating a symbolic image formed from the three-dimensional image of FIG. 3A according to an embodiment of the invention.

A process of registering images using symbolic images is illustrated in FIGS. 5A, 5B, 6, 7, 8A, 8B and 9. FIG. 5A shows a symbolic projection image 500 formed from volumetric image 300. FIG. 5B shows a symbolic image 550 formed by selecting points representing features in two-dimensional x-ray image 450. By registering symbolic image 500 and symbolic image 550, the relationship between the coordinate systems used by the volumetric scanner that forms volumetric image 300 and the x-ray projection scanner that formed two-dimensional x-ray image 450 can be determined.

In the processing that follows, it is assumed that symbolic image 500 and symbolic image 550 have the same scale such that each image would have the same width and height. If the images do not have the same scale, image 500 may be scaled to equalize the scale prior to subsequent processing. If image 500 is scaled, the same scale factor may be applied as a part of the transformation from the coordinate system of the volumetric scanner to the coordinate system of the x-ray projection scanner.

Figure 6:
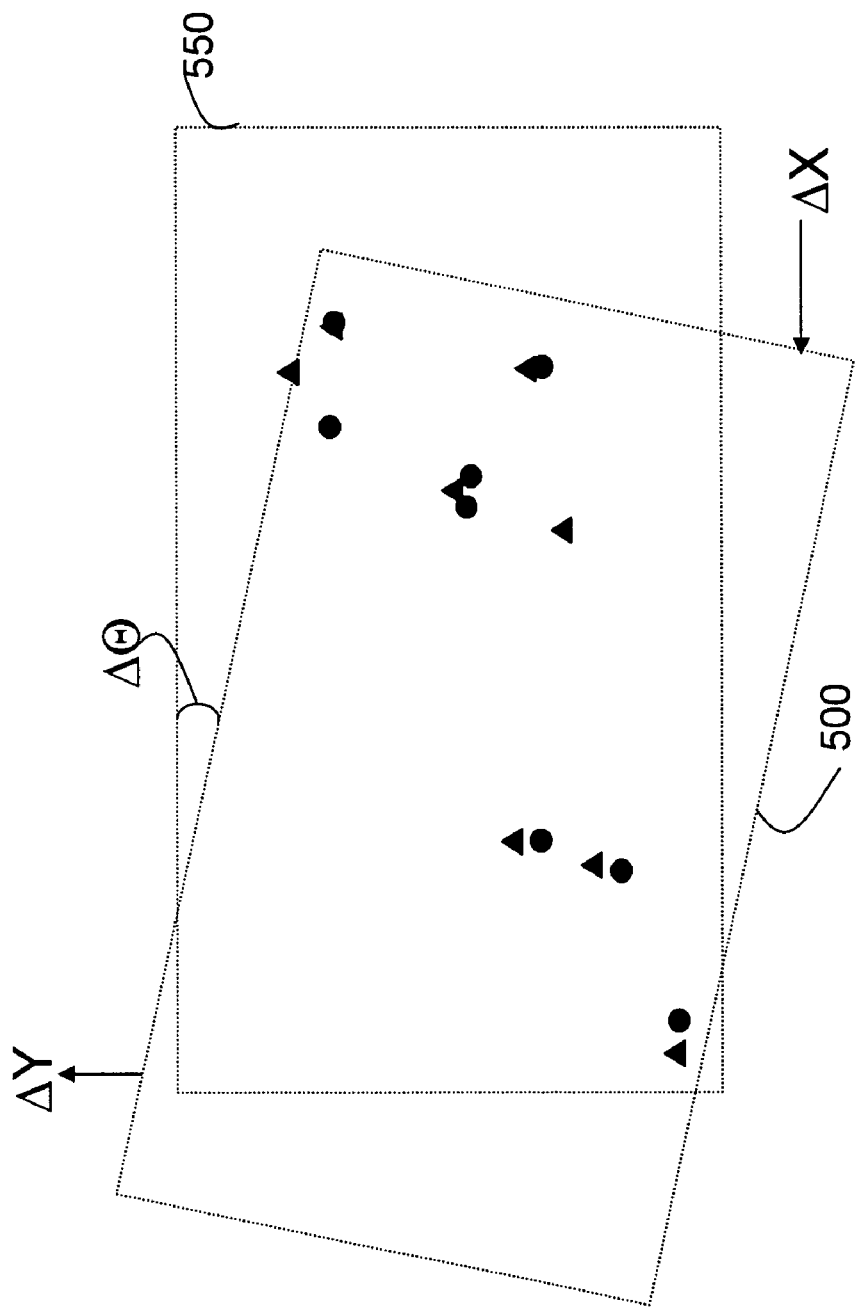
FIG. 6 is a sketch conceptually illustrating registration of the symbolic images of FIGS. 5A and 5B according to an embodiment of the invention

FIG. 6 illustrates conceptually the registration process. As shown in FIG. 6, symbolic image 500 is translated and rotated to align, as nearly as possible, the points in symbolic image 500 with the points in symbolic image 550. There may not be exact alignment between the points in the images. However, a known mathematical technique may be used to align symbolic image 500 with symbolic image 550 to minimize an error function representing the misalignment between points in symbolic image 500 and symbolic image 550.

FIG. 6 shows symbolic image 500 translated in the X direction by an amount $\Delta X$ and in the Y direction by an amount $\Delta Y$. To achieve the alignment shown in FIG. 6, symbolic image 500 is also rotated by an amount $\Delta \theta$. $(\Delta X, \Delta Y, \Delta \theta)$ collectively represent a transformation from symbolic image 500 to symbolic image 550. To relate a point in the coordinate system used by the volumetric scanner that formed volumetric image 310 to a point in coordinate system used by an x-ray projection scanner that formed two-dimensional x-ray image 450, the same transformation of $\Delta X$, $\Delta Y$, $\Delta \theta$ can be applied.

Figure 7:
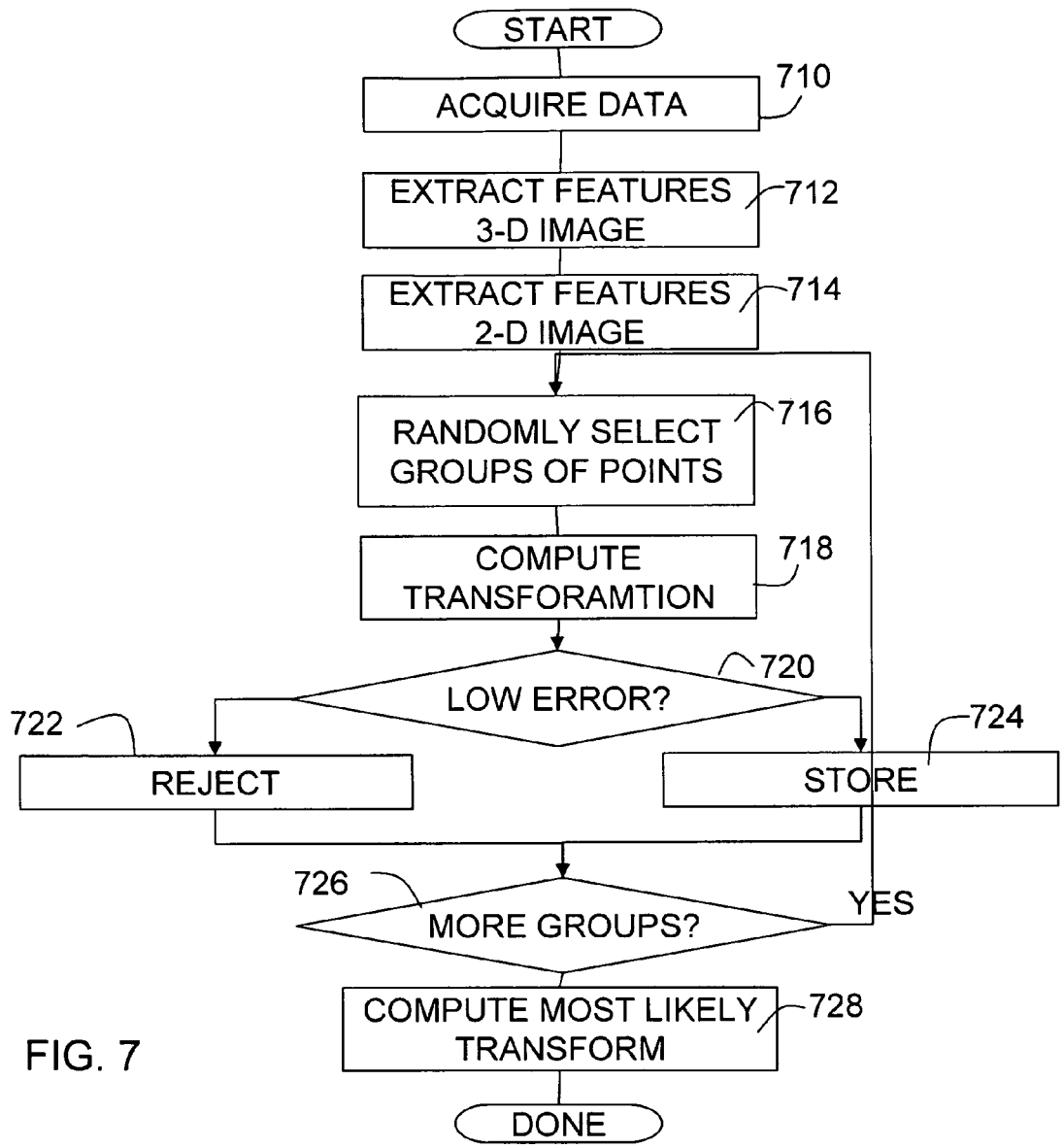
FIG. 7 is a flow chart of a coarse image registration process according to an embodiment of the invention.

As noted above, FIG. 6 conceptually represents the registration of symbolic images 500 and 550. However, simultaneously processing all of the points in both symbolic images to compute the best fit between the two images may be computationally complex. It may be desirable to register the images relatively quickly, for example in a matter of seconds. We have developed an alternative computational approach that allows the transformation needed to register symbolic images to be quickly computed. In some tests, a 2.8 GHz processor was programmed to perform registration on average in less than 20 seconds. Using a faster processor, of course, would further reduce the processing time. FIG. 7 shows an example of the processing that can be performed using this approach.

The processing of FIG. 7 begins at block 710. At block 710, data representing the images to be registered is acquired. In the described embodiment, a volumetric image and a projection image of an item are acquired.

At block 712, the volumetric image is processed to extract features. The feature extraction performed at block 712 may identify edges, corners or other features that are likely to appear in both a two-dimensional and a three-dimensional image. In the embodiment pictured in FIG. 7, features are extracted from the volumetric image using three-dimensional processing and then projected into a two-dimensional symbolic image. In other embodiments, the symbolic image can be formed by performing feature extraction on a volumetric projection of the volumetric image.

Processing then proceeds to block 714. At block 714, features are extracted from the two-dimensional x-ray image. Processing at block 714 may similarly use processing that selects edges, corners or other features in a two-dimensional x-ray image that are likely to also be visible in a three-dimensional volumetric image of the same item under inspection.

Processing then proceeds to block 716. Rather than comparing all of the features extracted at blocks 712 and 714, small groups of points representing extracted features are selected at block 716 for processing. Because most algorithms to compare sets of points have a processing complexity that increases exponentially in proportion to the number of points, processing small groups of points can significantly reduce the overall processing time, even if many small groups of points are processed. In one embodiment, groups of only two points are selected from each of the symbolic images. In the embodiment of FIG. 7, no effort is made to select points in each of the symbolic images that correspond to the same point in the item under inspection. Accordingly, the groups selected at blocks 716 may be selected randomly.

Once of group of points is selected from each of the symbolic images, processing proceeds to block 718. At block 718, a transformation that maps one group of selected points to the second group of selected points is computed. The processing performed at block 718 is illustrated in FIG. 8A.

FIG. 8A shows a first set of points $810_n$ in symbolic image 800 and a second set of points $812_n$ in symbolic image 850. If symbolic image 800 were moved so that first set of points $810_n$ were positioned at $810'_n$, the points in symbolic images 800 and 850 would be aligned with a very small error. As shown in FIG. 8A, transformation $T_n$ applied to symbolic image 800 results in this desired alignment of a first set of points $810_n$ and a second set of points $812_n$.

Transformation $T_n$ involves rotating and translating set of points $810_n$. Accordingly, transformation $T_n$ may be described by quantities $(\Delta X_n, \Delta Y_n, \Delta \Theta_n)$, where these values represent translation in the X direction, translation in the Y direction and rotation needed to align the two sets of points. Because there are only two points in each of the sets $810_n$ and $812_n$, computation needed to determine transform $T_n$ can be performed quickly. A similar transformation can be quickly computed for any other set of points selected.

After a transform is computed, processing proceeds to decision block 720. At decision block 720, the process branches based on how well the transformation computed at block 718 was able to align the selected groups of points. An error metric is used at decision block 720 to control the branching. In the described embodiment, the error metric provides a numeric indication of how well the points in the two groups, once transformed, aligned.

An error metric can be viewed conceptually by comparing FIGS. 8A and 8B. The magnitude of the error for groups of points shown in FIG. 8A, is very small because the points in symbolic images 800 and 850 have very little spacing between them. In contrast, FIG. 8B illustrates a scenario in which the selected groups of points cannot be aligned with low error. FIG. 8B shows symbolic images 801 and 851. A transformation $T_m$ applied to image 801 translates a group of points $820_n$ to a position $820'_n$ that minimizes the error between group $820'_n$ and group $822_n$. However, each point in group $822_n$ is separated from the nearest point in group $820'_n$ by a distance E. The distance E is relatively large compared to the small distance between points shown in FIG. 8A. Groups of points that produce a large error may be ignored in subsequent processing.

The condition illustrated by FIG. 8A occurs when the groups of points selected at block 716 correspond to the same features in the item under inspection. Conversely, the scenario depicted in FIG. 8B occurs when the groups of points selected do not correspond to the same features. Accordingly, the transformation $T_n$ depicted in FIG. 8A is representative of a transformation that can register the two symbolic images. However, because the points in symbolic images 801 and 851 (FIG. 8B) cannot be registered regardless of what transformation is used, the transformation $T_m$, though the best possible transformation for the selected groups of points, is not representative of the required transformation.

This recognition is used at decision block 720, which determines whether the selected groups of points were transformed to align with a sufficiently low error to conclude that the transformation computed at block 718 represents the transformation required to register the two images. If so, processing proceeds to block 724, where the computed transformation is stored. Conversely, if the error is too high, processing proceeds to block 722 where the computed transformation is rejected.

A specific numeric value used to define error may depend on many factors, such as the scale of the image, the feature extraction algorithms used and other factors. Accordingly, a specific threshold used to define a low error will vary from implementation to implementation and may be identified empirically or in any other suitable way.

Regardless of whether the transformation is stored or rejected, processing arrives at decision block 726. At decision block 726 a check is made whether more groups of points of points remain for processing. When more groups remain, processing branches to block 716 where two more groups of points are selected.

The total number of groups for which processing is desirable may depend on multiple factors. These factors may in turn depend on the specific implementation as well as the characteristics of the images being registered. Accordingly, the criteria used at decision block 726 to determine whether processing should loop back to block 716 for selection of more groups of points for processing may be set dynamically. For example, once a sufficient number of transformations have been stored to enable a reliable computation of the most likely transformation, further processing of groups of points may end. However, any suitable way for determining the number of sets of points to process may be used.

When no further groups of points remain for processing, the process branches from decision block 726 to block 728. At block 728, the most likely transform is computed from all of the transforms stored at block 724 as processing iterated through the loop formed by blocks 716, 718, 720, 722, 724 and decision block 726. Any suitable approach may be used to compute a most likely transformation from the set of stored transformations.

FIG. 9 illustrates conceptually how a most likely transformation is identified. FIG. 9 shows a three-dimensional graph, in which each stored transformation is depicted as a point. As described above, when the selected points in the symbolic images being registered depict the same points in the item under inspection, the transformation representing the actual transformation needed to register the images will be computed. However, if the selected points do not correspond to the same points in the item under inspection, the transformation computed will different from the actual transformation by an amount that will be random because the groups of points were randomly selected. Accordingly, the set of transformations will have a cluster around the actual transformation that causes the images to be registered with other transformations distributed around that cluster.

Accordingly, the most likely transformation may be selected by identifying a cluster of points in the graph of FIG. 9. FIG. 9 shows such a cluster 910. The most likely transform $T_S$ may be taken to be the center of cluster 910.

It is not necessary that the cluster be identified graphically. Computational techniques for selecting the center of a cluster of data points are known and a computer or other suitable processing device could be programmed to identify the center of the cluster in an appropriate fashion. Following selection of the most likely transform, the images may be regarded as registered.

Symbolic processing to register two images as depicted in FIG. 7 can be performed quickly, which is a desirable attribute. However, processing relies on the statistics of the features that are extracted from each image. Accordingly, the transformation computed at block 728 may be adequate for some applications, but not others. If greater registration accuracy is required than is achieved with the processing of FIG. 7, further processing can be performed.

In some embodiments, the processing of FIG. 7 serves as a coarse registration process. That processing is followed by a fine registration process that more accurately registers the images. An example of a fine registration process is shown in FIG. 10.

Figure 10:
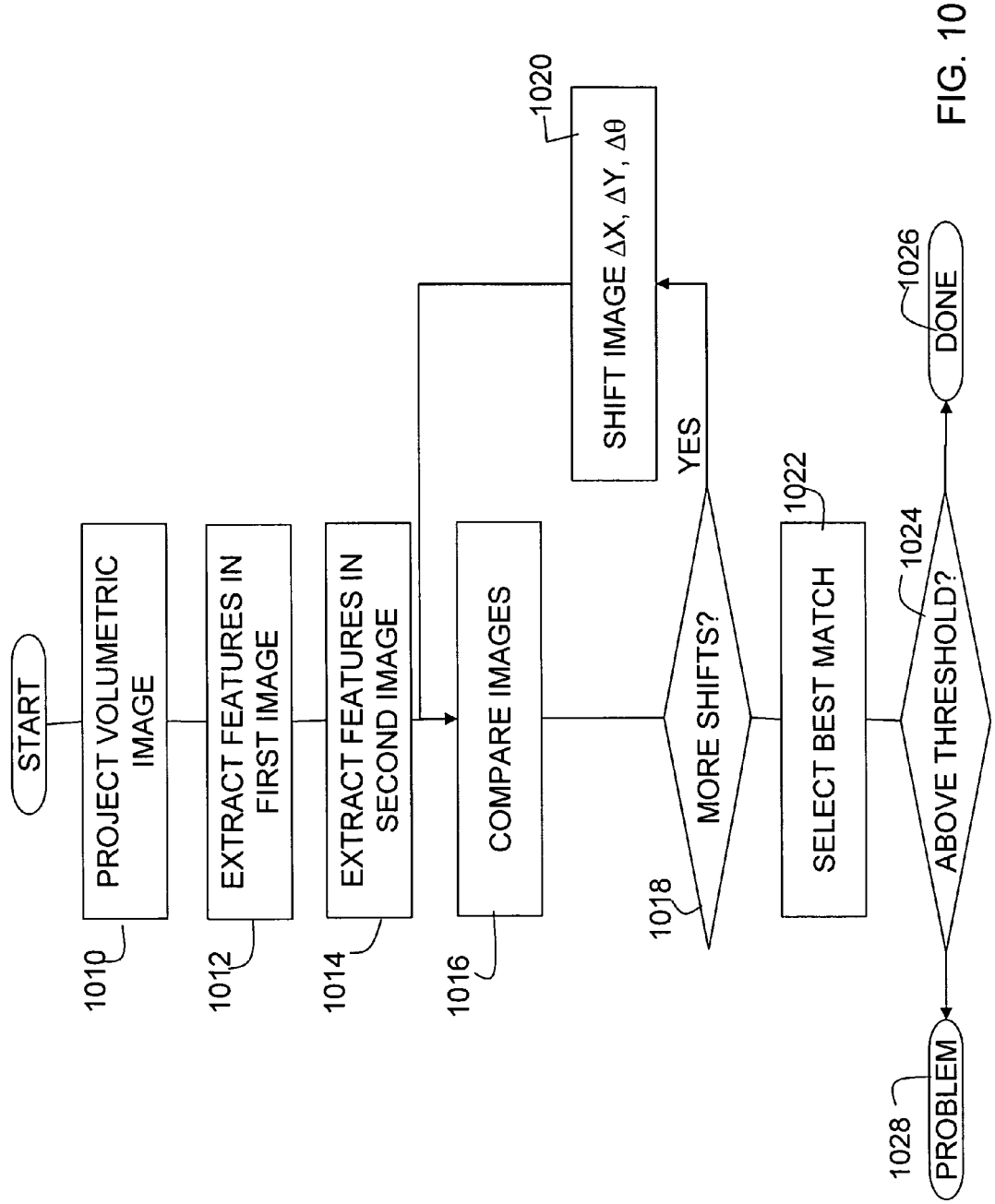
FIG. 10 is a flow chart of a fine image registration process according to an embodiment of the invention.

The process of FIG. 10 aligns the volumetric projection of the volumetric image with the two-dimensional x-ray image. Accordingly, processing begins at block 1010 where the volumetric projection is computed.

In the process of FIG. 10, the two images are registered using an edge comparison process. Accordingly, edges must be extracted from the images. At block 1012, edges are extracted from the first of two images being registered. In this example the volumetric projection serves as a first image and edges are extracted from that image at block 1012.

Edges are also extracted from the second of the two images. In this example, the two-dimensional x-ray image serves as the second image and edges are extracted from that image at block 1014. More generally, image registration may be performed by comparing any set of similar features in the two images being compared. Regardless of the specific features used for comparing the images, those features are extracted at blocks 1012 and 1014.

At block 1016, the images are compared. Many techniques are known for comparing images and any suitable comparison technique can be used. In the pictured embodiment, the comparison is made by comparing the extracted features. The comparison at block 1016 results in computing a score indicating the similarity of the two images. A score may simply be computed as the percentage of corresponding pixels in the images with the same value or the percentage of pixels in one of the images representing a feature that corresponds to a pixel in the other image that also represents a feature.

Regardless of the specific approach used to make the comparison, if the images are registered, the computed score should be relatively high. If the images are not registered, the score will be lower. To find the position that registers the images, scores are computed with the images in numerous different relative positions and the relative position that results in the highest score is selected.

Accordingly, once a score is computed at block 1016, processing continues to decision block 1018 where the process branches based on whether more relative positions of the images remain for comparison. If so, the process branches to block 1020 where a relative shift is introduced between the two images and a score is again computed for the images at block 1016.

Processing continues iteratively in this fashion, with the images being shifted and a new score being computed at each iteration. At each iteration, the images could be shifted by the same amount and in a predetermined direction. Alternatively, the amount and direction of the shift at each iteration could be selected based on changes in the score that occurred in prior iterations. Processing techniques that iteratively select parameters in a way that reduces the number of iterations required to find a maxima of a function are known. Such a conventional technique may be employed to select the magnitude and the direction of the shift at each iteration.

Regardless of the specific criteria used at block 1020 to select the magnitude and direction of the shift at each iteration, the iterations will continue until, as determined at decision block 1018, a sufficient number of shifts have been performed. Any suitable criteria may be used to determine when a sufficient number of iterations have been performed. For example, a fixed number of iterations may be performed. Alternatively, the images could be shifted until all relative positions in a predetermined range are considered. As a further alternative, the number of iterations could be selected dynamically. For example, the iterations could end when a score is computed that is above a value, indicating a close match. Alternatively, the iterations could end when the scores from successive iterations converge.

Regardless of the specific criteria applied at decision block 1018, once scores have been computed for a sufficient number of scores, processing branches to block 1022. At block 1022, the highest score computed at block 1016 during any of the iterations is identified. The relative shift of the images used to compute that score defines the best transformation to register the images.

If the two images represent different images of the same item under inspection, the two images, when registered, should produce a relatively high score. Accordingly, at decision block 1024 the highest score can be compared to a threshold. If the best score is above a threshold representing an acceptable level of correlation between the images, the process branches to termination point 1026, where the process terminates. The specific value defining an appropriate threshold may depend on details of implementation and may be determined empirically or in any other suitable fashion.

If the process reaches termination point 1026, the shift identified at block 1022 is selected to define the transformation needed to register the images. Conversely, if the best score does not exceed the threshold, the process branches to termination point 1028. If the process reaches termination point 1028, it is likely that a problem occurred. A problem could have one of numerous possible causes. Processing at problem termination point 1028 may detect and/or address some or all of the possible causes of a problem.

For example, in an embodiment in which shifts are considered in only one plane, a problem could be caused by the item under inspection moving out of that plane between the first image was acquired and when the second image was acquired. In the explosive detection system of FIG. 1, if the item under inspection is flipped between the first level and second level scanner, transformations that consider only translation in the X and Y directions and rotation in the Θ direction will not register the images. Accordingly, processing at error termination point 1028 may involve determining whether the item under inspection was flipped.

As another example, the item under inspection that was imaged to form the volumetric image may have been removed from the baggage handling system before reaching the second level scanner. Consequently, images formed at the second level scanner will not represent the same item. A related problem can occur if additional items are placed on the baggage handling system between. Problem resolution at problem termination point 1028 can address these problems, whether in an automated or manual fashion.

When processing reaches termination point 1026, the processing depicted in FIG. 10 has computed accurate registration of the images. As described, the process of FIG. 10 is used to improve on the accuracy of the registration performed by the process of FIG. 7. It is possible that the process of FIG. 10 could be used to register images without using the processing of FIG. 7. However, such processing, though more accurate, is more computationally intensive.

If the process of FIG. 10 is used without the process of FIG. 7 as a preprocess, it is possible that initial iterations through the loop including blocks 1016, decision block 1018 and block 1020 could be performed using relatively large shifts at block 1020. When an approximate registration of the images is detected, such as by a relatively high score computed at block 106, the size of the shifts could be reduced. In this way, a coarse and fine registration could be performed using only the process of FIG. 10.

Regardless of the specific embodiment used to register the images, when used in an explosive detection system as in FIG. 1, the transformation identified to register the images can be used to transform locations in the volumetric image to coordinates used by the second level scanner. Such an approach is particularly useful when the second level scanner is a coherent x-ray scatter system or other device that can be focused on a specific region in an item under inspection. Such processing may be performed as part of an automated process executed by software within processing module 168.

Processing module 168 may use the location information provided over network 150 to select for further inspection one or more regions within item under inspection 101. Processing module 168 may use the computed transformation to convert the regions, which are identified in the coordinate system of volumetric scanner 110, to regions to be inspected by second level scanner 160. Processing module 168 may then identify the regions to be inspected to control module 168, which may then control second level scanner 160 to make the required measurements. The information obtained by scanning at second level scanner 160 may then be used as in a conventional explosive detection system to either clear the item under inspection or route it for further handling based on the nature of the threat detected in the item. In this way, explosives detection system 100 can accurately and quickly process an item under inspection to determine whether it contains a threat object.

Having thus described several aspects of at least one embodiment of this invention, it is to be appreciated various alterations, modifications, and improvements will readily occur to those skilled in the art.

The approach is not limited to use in conjunction with systems as shown in FIG. 1. For example, FIG. 1 shows the first level scanner and the second level scanner being separated over a relatively long distance. Items must traverse multiple conveyors to reach the second level scanner from the first level scanner. The invention is not limited to use in such scenarios. For example, it could be used in conjunction with a system that has the first level scanner connected to the same conveyor as the second level scanner. Alternatively, the invention could be employed in a system in which the first level and second level scanners are in the same chassis or otherwise mechanically coupled.

For example, the invention is not limited to implementation in the exemplary embodiments described above. Though volumetric scanner 110 is described to be a CT system, other types of scanners could be used to obtain the required information. Alternatively, a multi-view system can provide three-dimensional spatial information about objects in an item under inspection. Such a system could be used in place of volumetric scanner 110. Image information generated by a multi-view system could be used to identify features in an item under inspection. These features could be used to generate the points for symbolic registration as described in conjunction with FIG. 7.

Alternatively or additionally, dual energy scanners may be used to form images.

Additionally, the invention is not limited to use in explosive detection systems. It may be used in any contraband detection system or in any other application in which it is desirable to register two images.

Such alterations, modifications, and improvements are intended to be part of this disclosure, and are intended to be within the spirit and scope of the invention. Accordingly, the foregoing description and drawings are by way of example only.

What is claimed is:

1. A method of registering a first image with a second image, the method comprising:
   a) identifying a plurality of points in the first image;
   b) identifying a plurality of points in the second image;
   c) for each of a plurality of pairs of subsets, each pair of subsets comprising a subset of the plurality points in the first image and a subset of the plurality of points in the second image, computing a transformation that maps the subset of points in the first image to the subset of points in the second image;
   d) identifying a likely transformation from the transformations for each of the plurality of subsets; and
   e) using the likely transformation in registering the first image and the second image.

2. The method of claim 1, wherein identifying a likely transformation comprises selecting a transformation based on the frequency of occurrence of the likely transformation in the transformations computed for the plurality of pairs of subsets.

3. The method of claim 1, wherein identifying a likely transformation comprises deemphasizing transformations for pairs of the plurality of pairs of subsets having a high error.

4. The method of claim 3, wherein deemphasizing transformations comprises:
  i) computing errors in transformation for each of the plurality of pairs;
  ii) selecting those transformations having an error below a threshold; and
  iii) identifying a likely transformation from the selected transformations.

5. The method of claim 4, wherein identifying a likely transformation comprises selecting a transformation from a cluster.

6. The method of claim 1, wherein identifying a plurality of points in the first image comprises extracting features from the first image and selecting the plurality of points on the features.

7. The method of claim 6, wherein identifying a plurality of points in the second image comprises extracting features from the second image and selecting the plurality of points on the features.

8. The method of claim 6, wherein computing a transformation that maps the subset of the plurality of points in the first image to the subset of the plurality of points in the second image, comprises mapping a subset consisting essentially of two points in the first image to a subset consisting essentially of two points in the second image.

9. The method of claim 1, wherein the first image is a three-dimensional image end the second image is a two-dimensional image and identifying a plurality of points in the first image comprises selecting a plurality of locations in the three-dimensional image and projecting those locations into points in a two-dimensional projection.

10. The method of claim 1, additionally comprising scaling at least one of the first or second images to match the scale of the first image to the second image.

11. A method of operating a contraband detection system to inspect an item, the method comprising:
  a) forming a volumetric image of the item in a first coordinate system;
  b) identifying a region of interest in the item using the volumetric image;
  c) forming a projection image of the item in a second coordinate system;
  d) registering the volumetric image to the projection image to identify the region of interest in the second coordinate system; and
  e) selecting a region of the item for further inspection based on the region of interest in the second coordinate system.

12. The method of operating a contraband detection system of claim 11, further comprising probing the selected region of interest in the item using coherent x-ray scattering.

13. The method of operating a contraband detection system of claim 12, wherein forming a volumetric image comprises processing data obtained from a helical CT scan of the item.

14. The method of operating a contraband detection system of claim 13, wherein the volumetric image is formed in a first location and the projection image is formed in a second location, and the method further comprises moving the item from the first location to the second location.

15. The method of operating a contraband detection system of claim 14, wherein moving the item from the first location to the second location comprises moving the item on a plurality of conveyors.

16. A method of operating a contraband detection system to inspect an item, the method comprising:
  a) forming a first image of the item in a first coordinate system, the first image including a region of interest;
  b) extracting features from the first image to form a first symbolic image;
  c) forming a second image of the item in a second coordinate system;
  d) extracting features from the second image to form a second symbolic image; and
  e) registering the first symbolic image to the second symbolic image to identify the region of interest in the second coordinate system.

17. The method of claim 16, wherein forming the second image of the item comprises forming a projection image of the item.

18. The method of claim 17, wherein forming a projection image of the item comprises forming an x-ray projection image of the item.

19. The method of claim 17, wherein forming the first image of the item comprises forming a volumetric image.

20. The method of claim 16, further comprising inspecting the region of interest with a coherent x-ray scattering probe.

* * * * *

UNITED STATES PATENT AND TRADEMARK OFFICE
CERTIFICATE OF CORRECTION

PATENT NO. : 7,738,687 B2 Page 1 of 1
APPLICATION NO. : 11/637226
DATED : June 15, 2010
INVENTOR(S) : John Oliver Tortora et al.

It is certified that error appears in the above-identified patent and that said Letters Patent is hereby corrected as shown below:

Column 17, line 28 Claim 9, "image end" should be "image and"

Signed and Sealed this

Seventeenth Day of August, 2010

David J. Kappos
*Director of the United States Patent and Trademark Office*